United States Patent [19]

White et al.

[11] 4,011,787
[45] Mar. 15, 1977

[54] MINE ROOF BOLT ASSEMBLY

[76] Inventors: Lewis P. White, 3436 Brookwood Road, Birmingham, Ala. 35223; Francis E. White, 1437 Panorama Drive, Vestavia Hills, Ala. 35216

[22] Filed: June 20, 1975

[21] Appl. No.: 588,904

[52] U.S. Cl. .................................. 85/76; 61/45 B; 85/87
[51] Int. Cl.² ................... F16B 33/04; E21D 21/00
[58] Field of Search ................. 61/45 B; 85/75, 76, 85/86, 87

[56] References Cited
UNITED STATES PATENTS

| | | | |
|---|---|---|---|
| 3,115,056 | 12/1963 | Teeple | 61/45 B X |
| 3,221,590 | 12/1965 | Dickow | 85/76 |
| 3,248,998 | 5/1966 | Siegel | 85/87 |
| 3,306,051 | 2/1967 | Howlett | 61/45 B |
| 3,618,326 | 11/1971 | Montgomery | 61/45 B |

*Primary Examiner*—Paul R. Gilliam
*Assistant Examiner*—David H. Corbin
*Attorney, Agent, or Firm*—Shlesinger, Arkwright, Garvey & Dinsmore

[57] ABSTRACT

A mine roof bolt assembly including a roof bolt, one end of which has rolled threads, leaving the outer periphery of the end of the roof bolt jagged, and the central portion thereof of concave configuration. An expansion shell is mounted on the roof bolt and includes expandable leaves held together by means which permit limited radially outward movement under urging of a wedge member threadedly engaged with the roof bolt. A stop tab carried by the expansion shell limits the penetration of the roof bolt into the expansion shell. The stop tab is provided with a downwardly struck indentation which engages the concave portion of the roof bolt, the stop tab being spaced from the jagged peripheral edge of the roof bolt.

9 Claims, 8 Drawing Figures

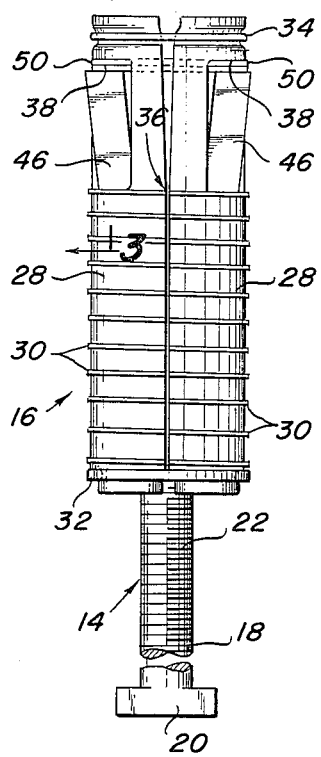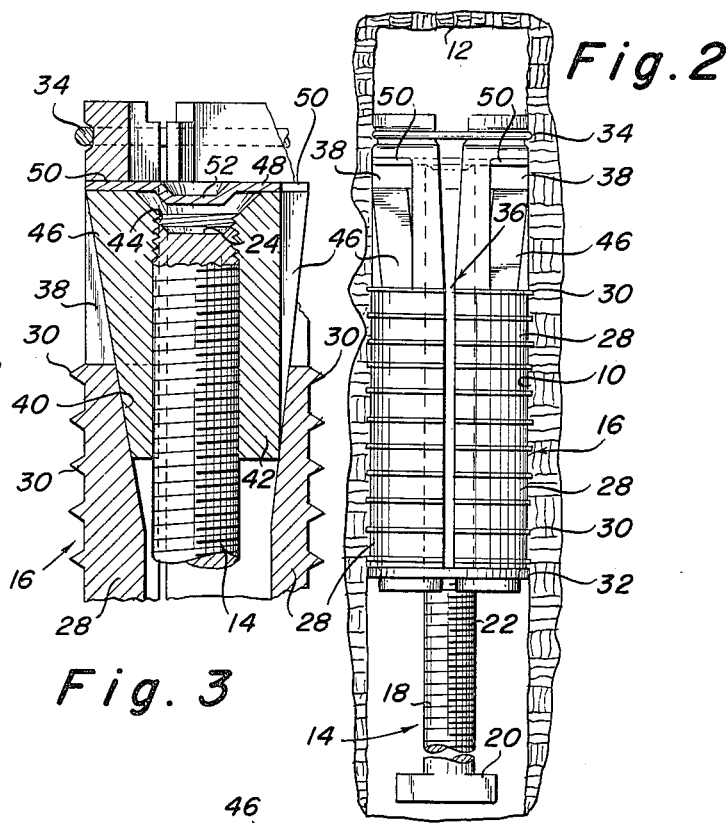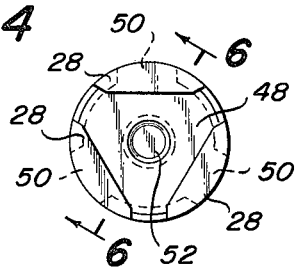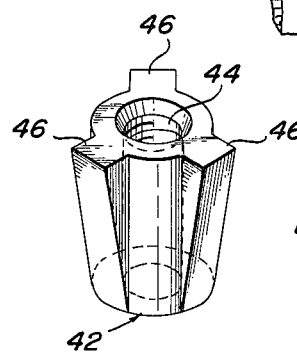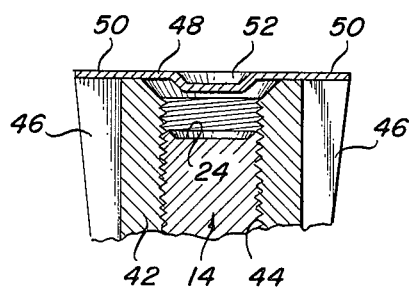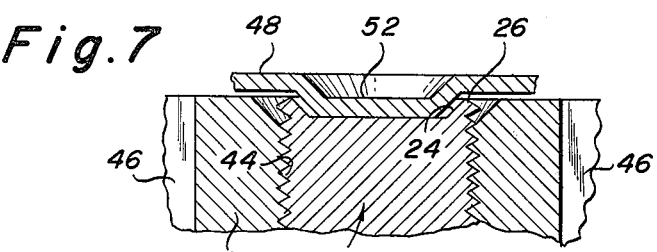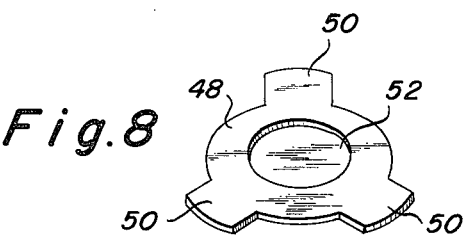

MINE ROOF BOLT ASSEMBLY

BACKGROUND AND OBJECTS

Roof bolts for use in mines generally include an elongated bolt having an expansion member for engagement with the roof strata at a point remote from the bolt head. Most mine roof bolts are now made with rolled threads and, in the process of rolling the threads the end of the bolt is deformed into a generally smooth concave configuration, the outer periphery thereof being jagged. In use of such bolts with expansion shells of the type embodying expansion members, a wedge member for actuating the expansion members and a stop member against which the threaded end of the bolt abuts, problems have been encountered affecting the proper installation of the assembly in the mine roof opening. The rotation of the bolt against the stop member to actuate the expansion member sets up friction between the stop member and bolt, with resultant galling of the stop member due to the frictional engagement of the jagged peripheral edge which bears on the stop member. In turn, this causes the expansion member to spin in the bolt hole, instead of expanding and properly engaging the mine roof strata.

It is an object of this invention to provide a mine roof bolt assembly embodying a roof bolt to which is threadedly engaged an expansion member, wherein a minimum of friction is produced between the mine roof bolt and expansion member, thereby allowing relative rotation of the roof bolt with respect to the expansion member and facilitating the installation of the mine roof bolt assembly in the mine opening.

Another object is to provide a mine roof bolt assembly of the character described wherein a portion of the stop member of the expansion member engages the central concave portion of the roof bolt end, the stop member being in spaced relation to the jagged peripheral edge thereof, thereby preventing galling of the stop member and undue friction between the roof bolt and expansion member.

A further object is to provide a mine roof bolt assembly of the character described wherein the stop member includes a substantially planar tab, the central portion of which is struck downward to provide an indentation which engages the central concave portion of the bolt end.

Other objects will be apparent from the following detailed description of the invention taken in conjunction with the appended drawing.

DESCRIPTION OF THE FIGURES OF THE DRAWING

FIG. 1 is a fragmentary side elevational view of a mine roof bolt assembly constructed in accordance with the present invention, the assembly being illustrated in inoperative position.

FIG. 2 is a view similar to FIG. 1 showing the mine roof bolt assembly in operative position and inserted into a mine roof opening.

FIG. 3 is an enlarged fragmentary sectional view taken along the line 3—3 of FIG. 1, looking in the direction of the arrows.

FIG. 4 is an end elevational view of the present invention as viewed in FIG. 1.

FIG. 5 is a perspective view of a wedge member forming a part of the present invention.

FIG. 6 is an enlarged sectional view taken along the line 6—6 of FIG. 4, looking in the direction of the arrows, and showing the present invention in inoperative position.

FIG. 7 is an enlarged section view similar to FIG. 6, showing the present invention in operative position.

FIG. 8 is a perspective view of a stop tab forming a salient part of the present invention.

DETAILED DESCRIPTION OF THE INVENTION

In FIG. 2, there is illustrated the mine roof bolt assembly of the present invention installed in an opening 10 of a mine roof 12.

The roof bolt assembly is preferably of steel construction and includes a roof bolt generally designated 14 on which is mounted an expansion shell 16, the roof bolt and expansion shell being operable in a well known manner to effect radial outward movement of the expansion shell into retaining engagement with strata of mine roof 12 proximate opening 10.

Roof bolt 14 includes a shank portion 18 having a head 20 at one end thereof. The opposite end of roof bolt 14 is threaded at 22 for engagement with a part of the expansion shell.

Threads 22 are preferably formed by a rolled process which, as shown to advantage in FIGS. 6 and 7 of the drawing produces a bolt end which is generally concave as indicated at 24, leaving a jagged peripheral edge 26.

Expansion shell 16 includes two or more like, elongated leaves 28 of generally transversely arcuate construction, the outer faces of which leaves are provided with transverse retaining ribs 30. Three leaves, as illustrated in the drawing, have been found to give optimum results.

Leaves 28 are held together by a washer-like retaining ring 32 disposed in a transverse peripheral recess at one end of each leaf. The opposite or upper end of the leaves, when positioned for use is also provided with a like, annular recess adapted to receive a yieldable spring member 34 which will permit slight radially outward movement of the leaves. There is thereby formed a space 36 between adjacent leaves which space will increase in size as the leaves are moved to the expanded position shown in FIG. 2.

Each leaf 28 is provided with an elongated vertical opening 38 between upper rib 30 and yieldable spring member 34. The function of opening 38 will be hereinafter more fully set out. The inner wall of each leaf is progressively reduced in thickness from a point proximate the middle thereof to elongated vertical opening 38 to provide a wedging surface 40, as shown to advantage in FIG. 3.

Expansion shell 16 further includes a wedge member 42 adapted for cooperation with leaves 28, which wedge member has a threaded axial bore 44, which is adapted for threaded engagement with portion 22 of roof bolt 14. Wedge member 42 is provided with a plurality of spaced wedge-shaped portions 46 which extend outwardly from the main body thereof and correspond in number to the number of leaves 28 of the expansion member. The wedge-shaped portions are adapted to protrude slightly through vertical elongated openings 38 when the assembly is in the inoperative position shown in FIG. 1. Wedge-shaped portions 46 are adapted to engage wedge surface 40 of each leaf 28, as shown to advantage in FIG. 3.

In accordance with the objects of the present invention, a stop tab 48 is positioned within the expansion shell 16 above bolt 14 in order to positively limit the degree of entry of the roof bolt into the expansion member. Stop tab 48 is of generally planar circular conformation and is provided with a plurality of spaced ears or flanges 50 extending radially outwardly from the periphery of the main body portion of the stop tab. Ears or flanges 50 extend into openings 38 of leaves 28 and correspond in number to the number of leaves and vertical openings of the expansion shell.

The central portion of stop tab 48 is struck downwardly to provide an indentation 52, which struck portion is adapted to engage the concave portion 24 of roof bolt member 14 as shown to advantage in FIGS. 2 and 7. As also shown to advantage in FIG. 7, the indentation 52 is of such a size and depth as to provide a spacing between the jagged peripheral edge 26 of roof bolt member 14 and the stop tab 48. In this way, upon relative rotation of roof bolt member 14 with respect to stop tab 48, there is no galling of the stop tab which would otherwise occur, and consequently no friction between these parts to the extent that expansion shell member 16 rotates with roof bolt member 14.

OPERATION

In use of the mine roof bolt assembly of the present invention, the expansion shell is inserted into opening 12 in the inoperative position shown in FIG. 1. Upon rotation of roof bolt member 14 stop tab 48 is urged upwardly by the inner end of the roof bolt until ears 50 engage the upper limit of each elongated vertical opening 38.

Continued rotation of roof bolt 14 effects a downward movement of wedge member 42 and engagement of wedge shaped portions 46 thereof with complemental wedging surfaces 40 of leaves 28. This in turn produces a radially outward force on leaves 28 with resultant movement of the leaves against the force of spring 34, causing space 36 between the leaves to increase and effect gripping engagement of ribs 30 of the leaves with the roof strata. During this period, concave portion 24 of roof bolt 14 remains in contiguous engagement with indentation 52 of stop tab 48, and stop tab 48 remains spaced from peripheral edge 26 of roof bolt 14. In this way, friction between the stop tab and mine roof bolt is minimized, thereby insuring the relative rotation of roof bolt member 14 with respect to expansion shell member 16.

While there has been herein shown and described the presently preferred form of this invention, it is to be understood that such has been done for purposes of illustration only and that various changes may be made therein within the scope of the appended claims.

What is claimed is:
1. A mine roof bolt assembly including:
a. a roof bolt, one end of which is threaded,
b. an expansion shell threadedly engaged with the threaded end of said roof bolt and comprising a plurality of leaves,
c. a first means for normally holding said leaves together,
d. said expansion shell further including wedge means between said leaves in threaded engagement with the threaded end of said roof bolt, a portion of said wedge means engaging said leaves for forcing the latter outwardly upon movement of said wedge means longitudinally of said roof bolt and leaves,
e. a stop member positioned between said leaves beyond the threaded end of said roof bolt,
f. said stop member including a body portion in the path of the threaded end of said roof bolt,
g. said stop member body portion having means for engaging the central part of the terminal of the roof bolt threaded end and spacing the body portion from the periphery of the roof bolt, said stop member engaging and limiting the penetration of the roof bolt into the expansion shell whereby movement of said wedge means in a direction to force said leaves outwardly, is effected, and
h. a second means on said stop member body portion engageable with said leaves for limiting the longitudinal movement of the stop member with respect to said leaves under urging of said roof belt.
2. The mine roof bolt assembly of claim 1, wherein:
a. said first means includes annular members engageable with said leaves proximate the longitudinal extremities thereof for normally holding said leaves together,
b. at least one of said annular members being yieldable to permit movement of said leaves outwardly from said roof bolt.
3. The mine roof bolt assembly of claim 1, wherein:
a. said stop member includes a body portion of generally circular conformation,
b. the central part of said body portion being struck to provide an indentation engageable with the central part of the roof bolt end and spaced from the peripheral portion thereof.
4. The mine roof bolt assembly of claim 1, wherein:
a. said second means includes spaced ears extending outwardly from the outer periphery of the body portion of said stop member, and
b. a third means on said leaves for receiving said ears to limit the longitudinal movement of said stop member with respect to said leaves.
5. The mine roof bolt assembly of claim 4, wherein:
a. said third means on said leaves for receiving said ears comprise openings in said leaves.
6. A mine roof bolt assembly including:
a. a roof bolt, one end of which is threaded,
b. an expansion shell threadedly engaged with the threaded end of said roof bolt and comprising a plurality of leaves,
c. each of said leaves having a vertical, elongated opening therein,
d. a first means for holding said leaves together,
e. each of said leaves having a wedging surface adjacent the elongated vertical opening,
f. a wedge member threadedly engaged with said roof bolt,
g. said wedge member including wedge-shaped portions engageable with the wedging surfaces of said leaves, whereby, upon relative movement of said wedge member with respect to said leaves, the latter are moved outwardly from said roof bolt,
h. a stop tab positioned between said leaves in the path of movement of the threaded end of said roof bolt for limiting the penetration of the latter into said expansion shell,
i. said stop tab including a body portion,
j. a second means extending outwardly from said body portion into the vertical, elongated openings of said leaves for limiting the longitudinal movement of said stop tab with respect to said leaves,
k. said stop tab body portion having means for engaging the central part of the terminal of the roof bolt threaded end and spacing the body portion from the periphery of the roof bolt, said stop tab engaging and limiting, the longitudinal movement of said roof bolt with respect to said leaves, whereby movement of said wedge member in a direction to force said leaves apart, is effected.

7. The mine roof bolt assembly of claim 6, wherein:
a. said means on said stop tab body portion comprises an indentation which engages the central portion of said roof bolt, the remainder of said stop tab being in spaced relation to the threaded peripheral portion of said roof bolt.

8. The mine roof bolt assembly of claim 7, wherein:
a. said stop tab body portion is of generally circular conformation,
b. the central part of said body portion being struck to provide an indentation engageable with the central part of the threaded end terminal of said roof bolt, and spaced from the peripheral portion of said roof bolt.

9. The mine roof bolt assembly of claim 8, wherein:
a. said second means extending outwardly from said body portion comprise spaced ears which are positioned in the vertical, elongated openings of said leaves.

* * * * *